United States Patent
Yan

(10) Patent No.: US 10,264,344 B2
(45) Date of Patent: Apr. 16, 2019

(54) HIFI SYSTEM BASED ON DIGITAL CONNECTION

(71) Applicant: TCL Technoly Electronics (Huizhou) Co., Ltd., Hulzhou (CN)

(72) Inventor: Hua Yan, Huizhou (CN)

(*) Notice: Subject to any disclaimer, the term of this patent is extended or adjusted under 35 U.S.C. 154(b) by 0 days.

(21) Appl. No.: 15/491,948

(22) Filed: Apr. 19, 2017

(65) Prior Publication Data

US 2018/0007460 A1 Jan. 4, 2018

(30) Foreign Application Priority Data

Jul. 1, 2016 (CN) .......................... 2016 1 0516617

(51) Int. Cl.
  *H04R 1/10* (2006.01)
(52) U.S. Cl.
  CPC ......... *H04R 1/1041* (2013.01); *H04R 1/1008* (2013.01); *H04R 1/1025* (2013.01)
(58) Field of Classification Search
  CPC ... H04R 1/1041; H04R 1/1008; H04R 1/1025
  See application file for complete search history.

(56) References Cited

U.S. PATENT DOCUMENTS

| 2009/0112338 A1* | 4/2009 | Ueda | H04M 1/6066 700/94 |
| 2010/0191536 A1* | 7/2010 | Sampat | G10L 19/22 704/500 |
| 2015/0023518 A1* | 1/2015 | Mizrahi | H04B 1/034 381/74 |

\* cited by examiner

*Primary Examiner* — David L Ton
(74) *Attorney, Agent, or Firm* — W&K IP

(57) ABSTRACT

The present disclosure provides a HIFI system based on digital connection, which includes an audio outputting device and a HIFI module, the audio outputting device is detachably connected with the HIFI module, when the audio outputting device is connected with the HIFI module, the audio outputting device is electrically connected with the HIFI module, the HIFI module includes a digital analog conversion circuit and a digital interface electrically connected with the digital analog conversion circuit, the digital interface transmits a received digital signal from external to the digital analog conversion circuit to be converted to an analog signal. The present disclosure only need to connect the HIFI module connected with the audio outputting device with the sound source device, and overcomes the problem that user cannot listen to the sound source due to the losing or forgetting to carry the digital analog converter.

9 Claims, 8 Drawing Sheets

HIFI SYSTEM BASED ON DIGITAL CONNECTION

CROSS-REFERENCE TO RELATED APPLICATIONS

This application claims priority to Chinese Patent Application No. 201610516617.8 with a filing date of Jul. 1, 2016, designating the United States, now pending. The content of the aforementioned application, including any intervening amendments thereto, are incorporated herein by reference.

TECHNICAL FIELD

The present disclosure relates to the field of audio device, and in particular, to a HIFI system based on digital connection.

BACKGROUND OF THE PRESENT INVENTION

With the development of science and technology, the audio outputting device (such as earphone, speaker, and so on) has been extensively applied in various fields. The audio outputting device has been roughly divided into two categories: one category is an analog connection audio outputting device (that is, the audio outputting device supports the inputting of the analog signal) which has the traditional 3.5 mm interface (that is, the coaxial audio plug has a diameter of 3.5 mm), the other category is an digital connection audio outputting device (that is, the audio outputting device supports the digital signal inputting) having the recently rising digital interface (such as the USB interface and so on).

However, as the digital connection audio outputting device is newly developing, the application field of the digital connection audio outputting device is relatively small, most of the audio device users use the analog connection audio outputting device, especially, in the headset users, the enormous application camp of 3.5 mm interface is formed, when user needs to listen to the audio in the sound source device which only supports the digital interface, as user often can only achieve the audio outputting device which supports the 3.5 mm interface, and have to transmit the digital signal audio in the sound source device to a storing device having the 3.5 mm interface and the digital interface by data line, then connect the analog connection audio outputting device with the storing device to listen to corresponding audio, which causes a technical problem that the operation of listen to the audio in the digital connection device is tedious, and time-consuming. So that digital analog converter (the converter can converse the digital signal outputted from the 3.4 mm interface to the analog signal supporting the digital interface) generates as the requirement, however, the volume of the digital analog converter is small, user is prone to loses or forgets to carry the digital analog converter, which causes that user cannot listen to the analog signal sound source by the digital connection audio outputting device in time.

SUMMARY OF PRESENT INVENTION

The present includes disclosure is to provide a HIFI system based on digital connection, which aims to solve the technical problem of that the user cannot listen to the sound source of the analog signal by digital connection audio outputting device in time due to the digital analog converter is easy to lost or forget to carry.

In order to achieve the above aim, the present disclosure provides a HIFI system based on digital connection, which includes an audio outputting device and a HIFI module, the audio outputting device is detachably connected with the HIFI module, when the audio outputting device is connected with the HIFI module, the audio outputting device is electrically connected with the HIFI module, the HIFI module includes a digital analog conversion circuit and a digital interface electrically connected with the digital analog conversion circuit, the digital interface transmits a received digital signal from external to the digital analog conversion circuit to be converted to an analog signal.

Preferably, the HIFI system based on, digital connection further includes a power module, the power module is detachably connected with the audio outputting device, when the power module is fixed with the audio outputting device, the power module is connected with a circuit of the audio outputting device, for supplying power to the audio outputting device.

Preferably, the power module is detachably connected with the HIFI module, when the power module is fixed with the HIFI module, the power module is connected with a circuit of the HIFI module, for supplying power to the HIFI module.

Preferably, the HIFI module further includes a power amplifier circuit and an audio outputting interface, the power amplifier circuit is electrically connected with the digital analog conversion circuit, for amplifying the analog signal conversed by the digital analog conversion circuit, the audio outputting interface is electrically connected with the power amplifier circuit for outputting the amplified analog signal.

Preferably, when the HIFI system based on digital connection is in a fast working state, the power module is electrically connected with the audio outputting device, the power module supplies power to the HIFI module and the audio outputting device, the HIFI module converses and amplifies the digital signal received by the digital interface for acquiring, the analog signal to be transmitted, the HIFI module transmits the analog signal to be transmitted to the audio outputting device for outputting corresponding audio.

Preferably, when the HIFI system based on digital connection is in a second working state, the power module and the HIFI module both disconnects with the circuit of the audio outputting device, the power module supplies power to the HIFI module, the HIFI module is signally connected with an external outputting device, the HIFI module converses and amplifies the digital received by the digital interface for acquiring the analog signal to be transmitted, the HIFI module transmits the analog signal to be transmitted to the external outputting device for outputting corresponding audio.

Preferably, when the HIFI system based on digital connection is in a third working state, an audio inputting interface of the audio outputting device is signally connected with an external inputting device, for realizing that the external inputting device supplies power to the audio outputting device, the audio outputting device receives an analog audio signal inputted by the external inputting device and directly outputs the analog audio signal.

Preferably, when the HIFI system based on digital connection is in a fourth working state, the audio outputting interface of the HIFI module is signally connected with an external outputting device, for realizing that the external outputting device supplies power to the HIFI module, the HIFI module converses and amplifies the digital signal received by the digital interface for acquiring the analog signal to be transmitted, the HIFI module transmits the analog signal to be transmitted to the audio outputting device for outputting corresponding audio.

Preferably, the HIFI module further includes at least one function key electrically connected with the power amplifier circuit, the function key is selected at least one from a group including a switching key, a volume stem/heel key, an advance key, a back key, and a pause key.

Preferably, the audio outputting device is an earphone, the audio outputting device has Hi-Res speaker, the audio outputting device is detachably connected with the HIFI device based on the magnetic element.

The audio outputting device of the present disclosure is detachably connected with the HIFI module, the HIFI module has the digital analog conversion circuit and the digital interface, as the HIFI module is closely linked with the audio outputting device in the physics assembly, when the user carries and uses the audio outputting device, the HIFI module is also carried and used, so user would not lost or forget to carry the HIFI module, at the same time, as the audio outputting device closely linked with the HIFI module normally has large volume, is easy to carry and not easy to lose, so that the HIFI module is also not easy to lose, when user needs to listen to the audio in the sound source device which only supports the digital interface, user only need to connect the HIFI module connected with the audio outputting device with the sound source device, the technical problem that user cannot listen to the analog signal sound source by the digital connection audio outputting device in time due to easy to lose or forget to carry the digital analog converter is overcomed, the experience of listen toing the audio and the application range are improved.

The realizing of the aim, functional characteristics, advantages of the present disclosure are further described in detail with reference to the accompanying drawings and the embodiments.

DETAILED DESCRIPTION OF PREFERRED EMBODIMENTS

It is to be understood that, the described embodiments are only some exemplary embodiments of the present disclosure, and the present disclosure is not limited to such embodiments.

Figure 1:
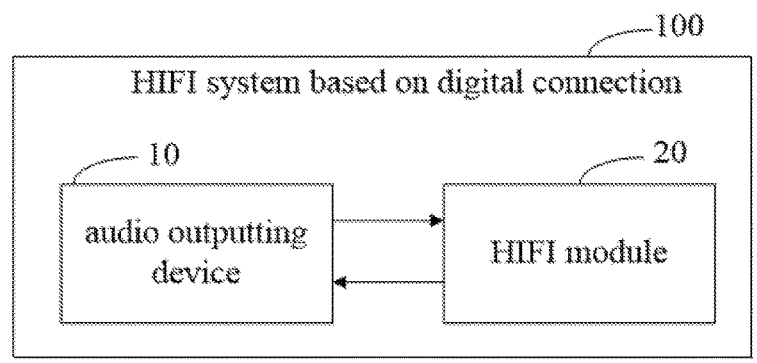
FIG. 1 is a frame diagram of the HIFI system based on digital connection provided by an exemplary embodiment of the present disclosure.

The present disclosure provides a HIFI (High-Fidelity) system based on digital connection, hereinafter, the HIFI system, in the first exemplary embodiment, referring to FIG. 1, the HIFI system 100 includes an audio outputting device 10 and a HIFI module 20, the audio outputting device 10 is detachably connected with the HIFI module 20, when the audio outputting device 10 is connected with the HIFI module 20, the audio outputting device 10 is electrically connected with the HIFI module 20, the HIFI module 20 includes a digital analog conversion circuit (not shown) and a digital interface (not shown) electrically connected with the digital analog conversion circuit, the digital interface transmits a received digital signal inputted from external to the digital analog conversion circuit, for the digital analog conversion circuit conversing the digital signal to an analog signal.

The audio outputting device 10 can be a wired earphone, a bluetooth earphone, a wired speaker or a bluetooth speaker, and so on, preferably, the audio outputting device 10 is an earphone; the HIFI module 20 has a physical housing, the digital analog conversion circuit and the digital interface are located in the physical housing, the digital interface is connected with an sound source device (that is, a digital sound source device) which only supports the digital interface, the digital analog conversion circuit is used for conversing a digital signal audio data sent by the digital wound source device to an analog signal audio data, the digital interface is selected at least one from a group including lightning interface, Type-C USB interface, micro USB interface, and Type-A USB interface; the audio outputting device 10 is detachably connected with the HIFI module 20, such as the audio outputting device 10 is detachably connected with the HIFI module 20 (such as a buckle connection, a detachable and magnetic adsorbing connection). The connecting area of the audio outputting device 10 and the connecting area of the HIFI module 20 both have a pogo-pin, the pogo-pin on the audio outputting device 10 supports the inputting of the analog signal audio data, the pogo-pin on the HIFI module 20 supports the outputting of the analog signal audio data, when the audio outputting device 10 is fixed with the HIFI module 20, the audio outputting device 10 is electrically connected with the HIFI module 20, the HIFI module 20 transmits the conversed analog signal audio data to the audio outputting device 10 for outputting.

In addition, an analog signal audio outputting interface (that is, the 3.5 mm outputting interface) can be set on the HIFI module 20, it is convenience for the HIFI module 20 outputs the analog signal audio data to other audio outputting device beside the HIFI system; an analog signal audio data inputting interface (that is, 3.5 mm inputting interface) can be set on the audio outputting device 10, it is convenience for that the audio outputting device 10 receives the analog signal audio data inputted by the analog signal sound source device besides the HIFI system; the adoption ranges of the HIFI module 20 and the audio outputting device 10 are improved, and the range of the application scenarios of the HIFI system 100 of the present disclosure is also improved.

In the exemplary embodiment, the HIFI system enables that the audio outputting device is detachably connected with the HIFI module, the digital analog conversion circuit and the digital interface are located in the HIFI module, as the HIFI module is closely linked with the audio outputting device in the physics assembly, when the user carries and uses the audio outputting device, the HIFI module is also carried and used, so user would not lost or forget to carry the HIFI module, at the same time, as when user takes and uses the audio outputting device, user also takes the HIFI module along, user would not easily lose or forget to take the HIFI module, as the audio outputting device closely connected with the HIFI module has large volume, is easier to carry, and not easy to lose, so that the HIFI module is also not easy to lose, when user needs to listen to the sound source device which only supports the digital interface, only needs to connect the HIFI module connected with the audio outputting device with the sound source device, the technical problem of that user cannot listen to the analog signal sound source in time by the digital connection audio outputting device is overcomed, the experience of listen toing the audio and the application range are improved. In addition, as the development of the speaker unit of the audio outputting device is limited, and the speaker unit is endurable, the electronic circuit and the audio processing software (such as, DSP processing which can realize virtual surround and active noise canceling through digital) update quickly, in the exemplary embodiment, the electronic circuit and the audio processing software which update quickly are located in the HIFI module, the endurable speaker unit is locate in the audio outputting device, so that when user need to update the HIFI system, user only needs to update the HIFI module, and withdraw the audio outputting device, it is convenience for user to update the hardware, and the cost of updating the hardware of the HIFI system is reduced.

Figure 2:
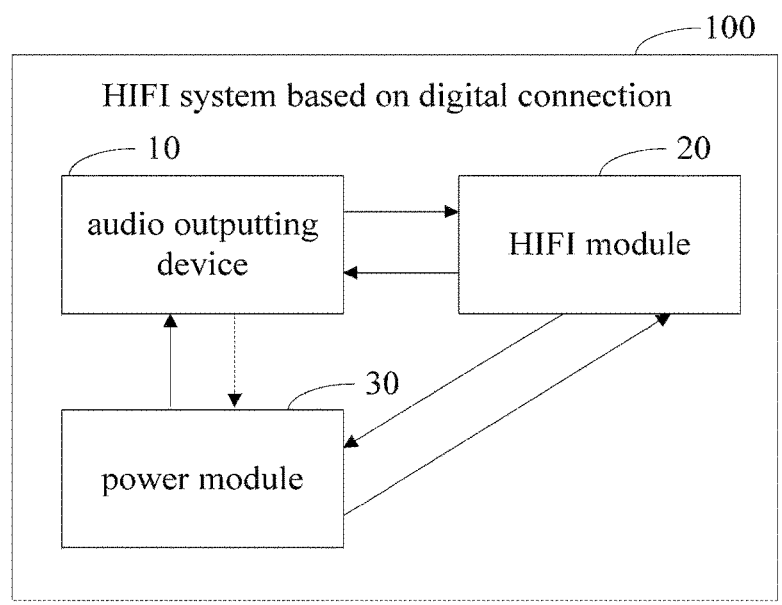
FIG. 2 is a frame diagram of the HIFI system based on digital connection provided by another exemplary embodiment of the present disclosure.

Furthermore, referring to FIG. 2, the HIFI system 100 also includes a power module 30, the power module 30 is detachably connected with the audio outputting device 10, when the power module 30 is fixed with the audio outputting device 10, the power module 30 is connected with a circuit of the audio outputting device 10, for supplying power to the audio outputting device 10.

Figure 5:
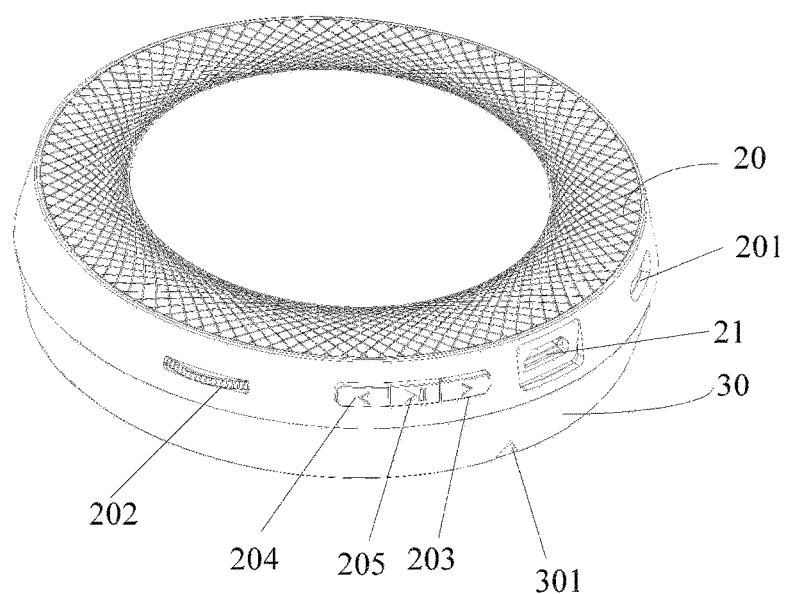
FIG. 5 is a view of a structure diagram of HIFI module and the power module are in the connecting state, when the audio outputting device of the HIFI system based on digital connection of the present disclosure is the earphone.
Figure 6:
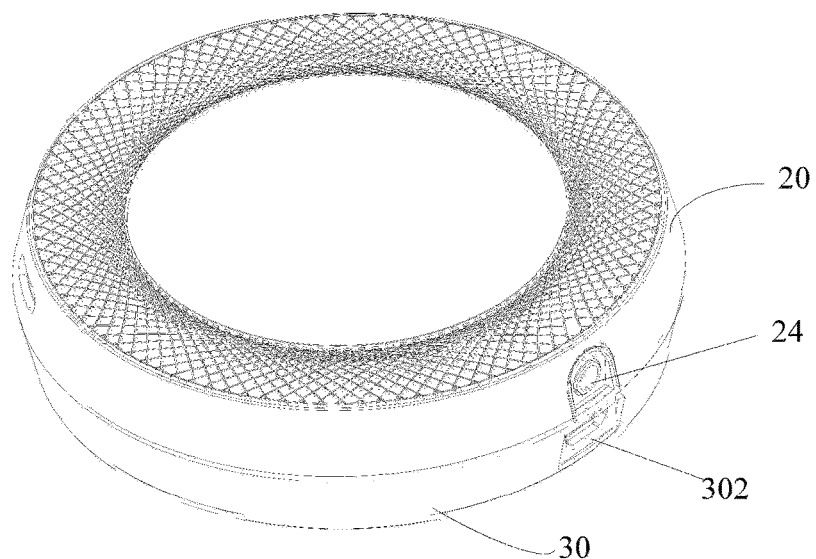
FIG. 6 is another view of a structure diagram of HIFI module and the power module are in the connecting state, when the audio outputting device of the HIFI system based on digital connection of the present disclosure is the earphone.

The audio outputting device 10 has at least two pogo-pins, one pogo-pin is connected with the HIFI module 20, the other one of the pogo-pin is connected with the power module 30, when the power module 30 is fixed with the audio outputting device 10, the power module 30 supplies power to the audio outputting device 10 and the HIFI module 20 connected with the audio outputting device 10 based on the pogo-pin. The power module 30 can be a storage battery or a transformer connected with mains supply, referring to FIGS. 5-6, the power module 30 can has a state indicator lamp 301 which can display the working states of the power module 30, and a charging interface 302 connected with external charging device.

The HIFI system 100 has the power module 30, the HIFI system 100 does not need to be charged by the external power or external sound source device, especially when the power reserve of the sound source device is low, or the power supply amount of the sound source device is small, such as, when the sound source device is a phone, the power reserve of the phone is low, and the phone cannot supply power for the high-powered audio outputting device, the HIFI system 100 can be self-powered for supporting the HIFI module 20 and the audio outputting device 10 to work normally, the problem that the HIFI system 100 cannot work normally due to that the sound source device cannot supply power or cannot supply enough power is avoided, the usage scenario of the product using the HIFI system is enriched.

In addition, referring to FIG. 2, the power module 30 is detachably connected with the HIFI module 20, when the power module 30 is fixed with the HIFI module 20, the power module 30 is connected with a circuit of the HIFI module 20, for supplying power to the HIFI module 20. So that, on the hardware support, the HIFI module 20 and the power module can be used separately, the HIFI module 20 can be signally connected with the external outputting device (the external outputting device can be audio outputting device besides the HIFI system), such as, the 3.5 mm outputting interface on the HIFI module 20 can be signally connected with the 3.5 mm inputting interface of the external outputting device through data line, the HIFI module 20 converses the digital signal (that is, the audio data having the digital signal format) received by the digital interface, for acquiring the analog signal to be transmitted, the HIFI module 20 transmits the analog signal to be transmitted to the external outputting device for outputting corresponding audio, and when user is not satisfied with the audio outputting device 10 of the HIFI system 100 of the present disclosure, the HIFI module 20 and the power module 30 can be connected with other corresponding external outputting devices, so that the HIFI system 100 can have better compatibility.

Furthermore, the audio outputting device can be earphone, the audio outputting device has Hi-Res (High Resolution Audio) speaker, the voice broadcast frequency supported by the Hi-Res speaker supports exceeds 40 kHZ, generally speaking, the higher the sampled frequency becomes, the bit depth is larger, which means that the description and revivification of the sound are much more accurate, and the audio with higher quality is outputted, the sampled frequency/the bit depth supported by the Hi-Res speaker unit can reach 192 kHz/24 bit, or higher resolution, which are much higher than the resolution of sound source which can be 44.1 kHz/116 bit and 48 kHz/24 bit and supported by the ordinary audio outputting device, so that the earphone of the exemplary embodiment supports the displaying of high quality audio data, and the HIFI system can support the decoding and displaying of high quality sound source digital data.

Electively, the audio outputting device can be detachably connected with the HIFI module based on the magnetic element, the magnetic element can be a part which is mainly consisted by magnet, in detail, the HIFI module has a first magnetic element, the audio outputting device has a second magnetic element, the audio outputting device can be detachably connected with the HIFI module based on the first magnetic element and the second magnetic element. When user needs to simultaneously use the audio outputting device and the HIFI module, user only need to enable the first magnetic element on the HIFI module to adsorb the second magnetic element on the audio outputting device; when user need to separately use the audio outputting device or the HIFI module, user only needs to separate the HIFI module from the audio outputting device magnetically connected with the HIFI module. Of course, the power module 30 can also has a third magnetic element, the power module 30 can be detachably connected with the second magnetic element of the audio outputting device 10 through the third magnetic element, the power 30 can also be detachably connected with the first magnetic element of the HIFI module 20 through the third magnetic element, that is, the first magnetic element, the second magnetic element and the third magnetic element can be magnetically detachably connected with each other, for realizing that the HIFI module 20, the audio outputting device and the power module can be detachable connected with each other.

It is to be understood that, the detachable connection between the components cannot be limited to a magnetic detachable connection, and can be other mechanical detachable connection.

Figure 4:
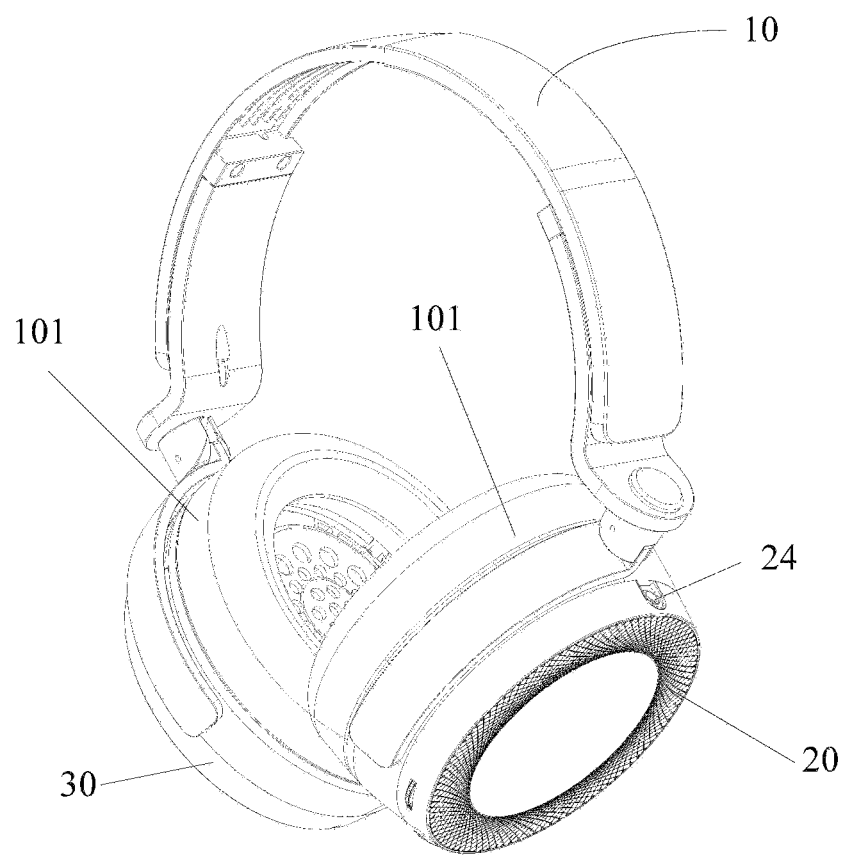
FIG. 4 is a structure diagram of the HIFI system based on digital connection, when the audio outputting device of the HIFI system based on digital connection is the earphone, provided by an exemplary embodiment of the present disclosure.
Figure 7:
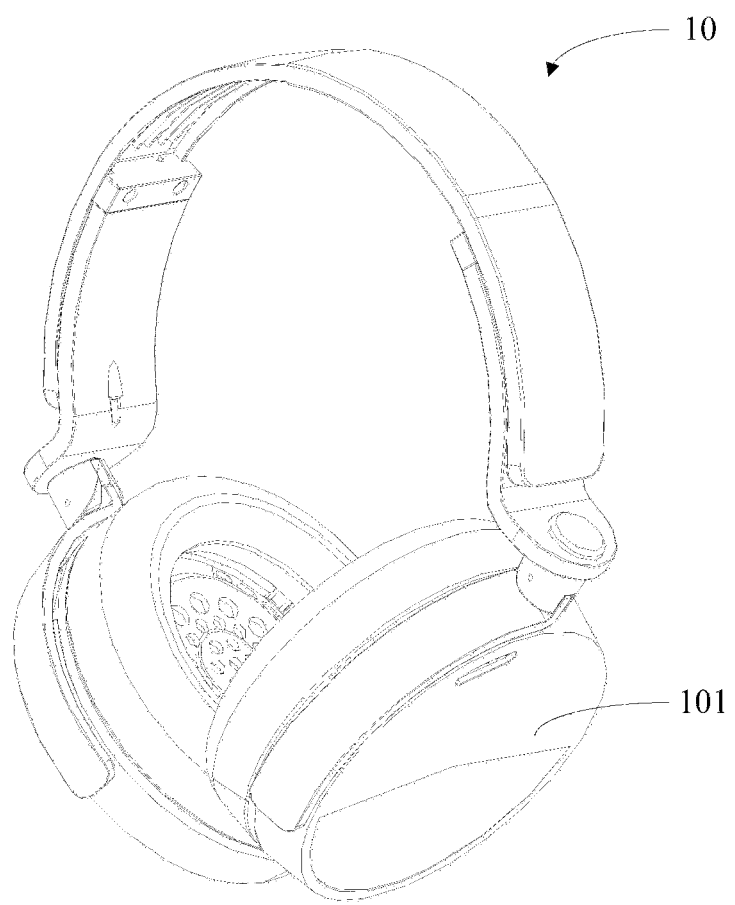
FIG. 7 is a structure diagram of the earphone, when the audio outputting device of the HIFI system based on digital connection is the earphone, according to an exemplary embodiment of the present disclosure.
Figure 8:
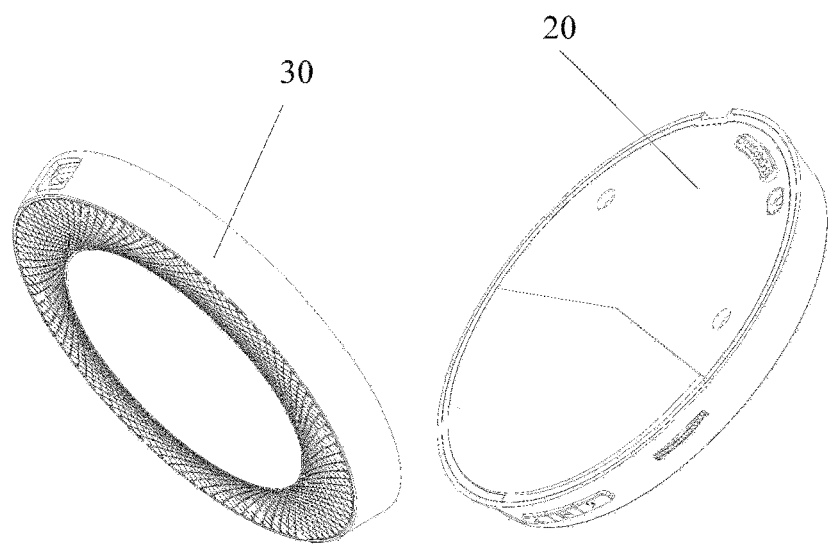
FIG. 8 is a view of a structure diagram of the HIFI module and the power module are in isolating state, when the audio outputting device of the HIFI system based on digital connection of the present disclosure is the earphone.

In detail, referring to FIG. 4 and FIG. 7, the audio outputting device 10 can be earphone, the earphone 10 includes two housing 101 which can be used for clamping user's ear, the second magnetic elements can be located at the lateral sides of the housings 101 respectively. When the earphone works normally, the housings attach the ears, the second magnetic elements are respectively located at the sides of the housings 101 away from user when the earphone works normally (that is, the lateral sides of the housings), when user uses the earphone normally, user can easily mount or take away the power module 30 and the HIFI module 20 from the lateral sides of the housing 101.

Figure 3:
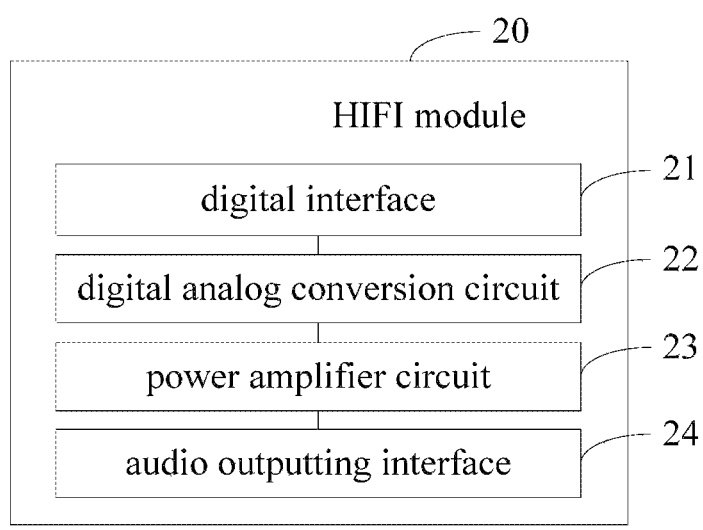
FIG. 3 is a function module diagram of the HIFI module of the HIFI system based on digital connection provided by a preferably exemplary embodiment of the present disclosure.

Furthermore, referring to FIG. 3, the HIFI module 20 also includes a power amplifier circuit 23 and an audio outputting interface 24, that is, the HIFI module 20 includes the digital interface 21, the digital analog conversion circuit 22, the power amplifier circuit 23 and the audio outputting interface 24, the power amplifier circuit 23 is electrically connected with the digital analog conversion circuit 22, for amplifying the analog signal conversed by the digital analog conversion circuit 22, the audio outputting interface 24 is electrically connected with the power amplifier circuit 23 for outputting the amplified analog signal. That is, the HIFI module 20 includes the digital interface 21, the digital analog conversion circuit 22, the power amplifier circuit 23 and the audio outputting interface 24 which are sequentially connected with each other, the task of the power amplifier circuit 23 is signally amplifying the analog signal audio data conversed by the digital analog conversion circuit 22, then transmits the amplified analog signal from the audio outputting interface 24 to the audio outputting device of the HIFI system or other outputting device besides the HIFI system, the audio outputting interface 24 can be 3.5 mm outputting interface. After the power amplifier circuit 23 and the audio outputting interface 24 are assembled in the HIFI module 20, the HIFI module 20 can not only ensure the outputted analog signal smoothly drive the audio outputting device in the HIFI system to display sound, but also drive high-power outputting device beyond the HIFI system to display sound Optionally, referring to FIGS. 3, 5, 6 and 8, the HIFI module 20 further includes at least one function key electrically connected with the power amplifier circuit 23, the function key is selected at least one from a group including a switching key 201, a volume starwheel key 202, an advance key 203, a back key 204, and a pause key 205, user can directly operate the function key on the HIFI module 20, for conveniently controlling and modifying the analog signal audio data outputted by the HIFI module 20, and the operability of the product and the diversity of the function of the HIFI system of the present disclosure are improved.

Furthermore, the HIFI system of the present disclosure has a plurality of working states, user can adjust the working states of the HIFI system by themselves based on their own needs.

When the HIFI system based on digital connection is in a first working state, the power module is electrically connected with the audio outputting device, the power module supplies power to the HIFI module and the audio outputting device, the HIFI module converses and amplifies the digital signal received by the digital interface for acquiring the analog signal to be transmitted, the HIFI module transmits the analog signal to be transmitted to the audio outputting device for outputting corresponding audio.

When the HIFI system is in the first working state, the audio outputting device is the earphone, for example, when the earphone is combined with the HIFI module, the earphone and the HIFI module can be used as the digital earphone, the HIFI module receives the digital connected Hi-Res audio (such as music), and conversed the digital signal Hi-Res audio to the analog signal to be transmitted, the HIFI module transmits the analog signal to be transmitted to the earphone, for realizing the displaying of the digital connected Hi-Res audio; of course, the Hi-Res audio can be other format audio, the HIFI system of the present disclosure can also realize the displaying of other format audio.

When the HIFI system based on digital connection is in a second working state, the power module and the HIFI module both disconnects with the circuit of the audio outputting device, the power module supplies power to the HIFI module, the HIFI module is signally connected with an external outputting device, the HIFI module converses and amplifies the digital received by the digital interface for acquiring the analog signal to be transmitted, the HIFI module transmits the analog signal to be transmitted to the external outputting device for outputting corresponding audio.

When the HIFI system is in the second working state, the build in audio outputting device 10 does not need to be used, the power module 30 is directly connected with the HIFI module 20, the combination of the power module 30 and the HIFI module 20 can be regarded as a digital audio portable earphone amplifier or a Hi-Res portable earphone amplifier which is digital input analog output (3.5 mm audio outputting interface), that is, digital input analog output converter and digital input analog output amplifier which both have power of themselves, when user is not satisfied with that the HIFI system has earphone (that is, the audio outputting device), the much more suitable earphone can be connected with the audio outputting device of the HIFI system.

When the HIFI system based on digital connection is in a third working state, an audio inputting interface of the audio outputting device is signally connected with an external inputting device, for realizing that the external inputting device supplies power to the audio outputting device, the audio outputting device receives an analog audio signal inputted by the external inputting device and directly outputs the analog audio signal.

When the HIFI system is in the third working state, the HIFI module 20 can be taken away from the audio outputting device, the audio outputting device can be directly connected with the external inputting device supporting the analog signal audio data through the 3.5 mm audio inputting interface build in the audio outputting device, the audio outputting device receives the analog audio signal inputted by the external inputting device, and directly outputs the analog audio signal, that is, the audio outputting device of the HIFI system can be used as traditional analog inputting high-fidelity audio output device (such as, analog inputting HIFI earphone).

When the HIFI system based on digital connection is in a fourth working state, the audio outputting interface of the HIFI module is signally connected with an external outputting device, for realizing that the external outputting device supplies power to the HIFI module, the HIFI module converses and amplifies the digital signal received by the digital interface for acquiring the analog signal to be transmitted, the HIFI module transmits the analog signal to be transmitted to the audio outputting device for outputting corresponding audio.

The HIFI system is in the fourth working state, the audio outputting device and the power do not need to be used, the HIFI module can be directly connected with the external outputting device (such as the bluetooth speaker), for displaying the digital inputted audio data, especially the Hi-Res music, for forming a product series, such as, the existing bluetooth speaker cannot support the bluetooth receive and display the Hi-Res music, if the 3.5 mm audio outputting interface of the HIFI module of the present disclosure is connected with the bluetooth speaker, the digital interface of the HIFI module is connected with the outputting end of the Hi-Res music, so that the bluetooth speaker supports the bluetooth receive and display the Hi-Res music.

The HIFI system has a plurality of working states, the usage scenario of the product using the HIFI system is enriched, the diverse using need of user is satisfied, and the function of the product using the HIFI system is improved.

The embodiments above are preferably embodiments of the present disclosure, and the present disclosure is not limited to such embodiments, equivalent structure conversion based on the specification and the drawing of the present disclosure, or directly or indirectly used in other related technical field, both similarly within the protection scope of the present disclosure.

I claim:

1. A HIFI (high fidelity) system based on digital connection, comprising: an audio outputting device and a HIFI module, the audio outputting device being detachably connected with the HIFI module, when the audio outputting device being connected with the HIFI module, the audio outputting device being electrically connected with the HIFI module, the HIFI module comprising a digital analog conversion circuit and a digital interface electrically connected with the digital analog conversion circuit, the digital interface transmitting a received digital signal from external to the digital analog conversion circuit to be converted to an analog signal;

wherein the HIFI system based on digital connection further comprises a power module, the power module is detachably connected with the audio outputting device, when the power module is fixed with the audio outputting device, the power module is connected with a circuit of the audio outputting device, for supplying power to the audio outputting device;

wherein the power module is detachably connected with the HIFI module, when the power module is fixed with the HIFI module, the power module is connected with a circuit of the HIFI module, for supplying power to the HIFI module;

wherein the HIFI module further comprises a power amplifier circuit and an audio outputting interface, the power amplifier circuit is electrically connected with the digital analog conversion circuit, for amplifying the analog signal conversed by the digital analog conversion circuit, the audio outputting interface is electrically connected with the power amplifier circuit for outputting the amplified analog signal;

wherein when the HIFI system based on digital connection is in a second working state, in which the power module and the HIFI module both disconnects with the circuit of the audio outputting, device, the power module is detachably connected to and supplies power to the HIFI module, the HIFI module is signally connected with an external outputting device, the HIFI module converses and amplifies the digital received by the digital interface for acquiring the analog signal to be transmitted, the HIFI module transmitting the analog signal to be transmitted to the external outputting device for outputting corresponding audio.

2. The HIFI system based on digital connection according to claim 1, wherein when the HIFI system based on digital connection is in a first working state, the power module is electrically connected with the audio outputting device, the power module supplies power to the HIFI module and the audio outputting device, the HIFI module converses and amplifies the digital signal received by the digital interface for acquiring the analog signal to be transmitted, the HIFI module transmits the analog signal to be transmitted to the audio outputting device for outputting corresponding audio.

3. The HIFI system based on digital connection according to claim 2, wherein the HIFI module further comprises at least one function key electrically connected with the power amplifier circuit, the function key is selected at least one from a group comprising a switching key, a volume starwheel key, an advance key, a back key, and a pause key.

4. The HIFI system based on digital connection according to claim 1, wherein when the HIFI system based on digital connection is in a third working state, in which the audio outputting device is detached from the audio outputting device, an audio inputting interface of the audio outputting device is signally connected with an external inputting device, for realizing that the external inputting device supplies power to the audio outputting device, the audio outputting device receives an analog audio signal inputted by the external inputting device and directly outputs the analog audio signal.

5. The HIFI system based on digital connection according to claim 4, wherein the HIFI module further comprises at least one function key electrically connected with the power amplifier circuit, the function key is selected at least one from a group comprising a switching key, a volume starwheel key, an advance key, a back key, and a pause key.

6. The HIFI system based on digital connection according to claim 1, wherein when the HIFI system based on digital connection is in a fourth working state, in which the audio outputting device is detached from the HIFI module, the audio outputting interface of the HIFI module is signally connected with an external outputting device, for realizing that the external outputting device supplies power to the HIFI module, the HIFI module converses and amplifies the digital signal received by the digital interface for acquiring the analog signal to be transmitted, the HIFI module transmits the analog signal to be transmitted to the audio outputting device for outputting corresponding audio.

7. The HIFI system based on digital connection according to claim 6, wherein the HIFI module further comprises at least one function key electrically connected with the power amplifier circuit, the function key is selected at least one from a group comprising a switching key, a volume starwheel key, an advance key, a back key, and a pause key.

8. The HIFI system based on digital connection according to claim 1, wherein the HIFI module further comprises at least one function key electrically connected with the power amplifier circuit, the function key is selected at least one from a group comprising a switching key, a volume starwheel key, an advance key, a back key, and a pause key.

9. The HIFI system based on digital connection according to claim 1, wherein the audio outputting device is an earphone, the audio outputting device has Hi-Res speaker, the audio outputting device is detachably connected with the HIFI device based on a magnetic element.

\* \* \* \* \*